United States Patent Office

3,475,629
Patented Oct. 28, 1969

3,475,629
OSCILLATING ELECTRIC MOTOR
Jean-Claude Lagier, Geneva, Switzerland, assignor, by mesne assignments, to E. R. Squibb & Sons, Inc., New York, N.Y., a corporation of Delaware
Filed Mar. 30, 1967, Ser. No. 627,208
Claims priority, application Switzerland, Mar. 30, 1966, 4,602/66
Int. Cl. H02k 33/18, 35/04
U.S. Cl. 310—36                    3 Claims

ABSTRACT OF THE DISCLOSURE

Oscillating electric motor the stator of which consists of a magnetizable core surrounded by an energizing coil and having two polar pieces extending parallel on either side of said core, the rotor having a permanent magnet pivoted between the polar pieces, these pieces each having a thin, incurved, shoe enveloping the rotor on at least a part of its periphery.

---

In motors of the type with which this invention is concerned and wherein the rotor is constantly brought back in a neutral position such that the axis of its poles is perpendicular to that passing by the two stator polar pieces, the curve of the couple exerted on the motor and measured as a static function thereof decreases very rapidly as soon as this rotor is moved angularly from its neutral position to bring it into another position out of phase by 90° with respect to the previous one. That is to say, with such a motor in dynamic operation, the angle of deviation of the rotor will be very sensitive to an external resistant couple since the couple exerted on this rotor is really powerful only near its neutral position.

The invention has for its principal object to avoid this drawback and provides an oscillating motor capable of so doing.

Preferably but not exclusively the rotor consists of a strongly anisotropic ferrite block and a maximum air-gap separating the rotor from the polar shoes is of the order of 1.5 mm.

The invention will now be described with reference to the accompanying drawings which represent one embodiment thereof.

Figure 1:
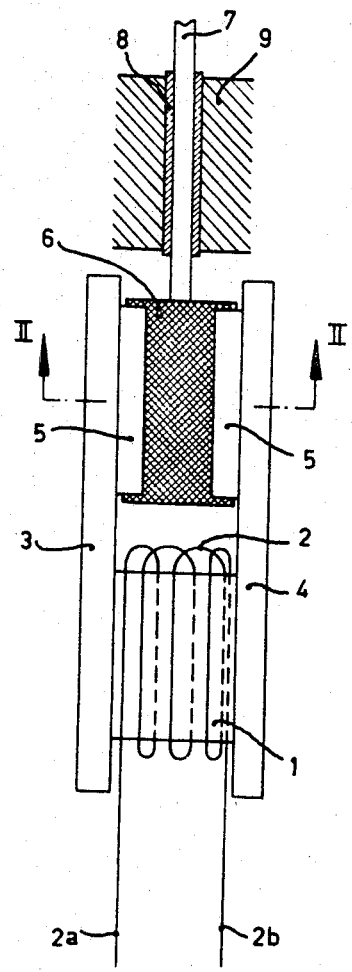
FIGURE 1 is a lateral schematic view of the motor according to the invention.
Figure 2:
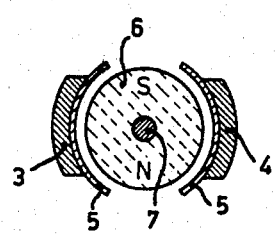
FIGURE 2 is a cross-sectional view taken along line II—II of FIGURE 1.

The oscillating motor shown comprises a stator formed by a lamellar core 1, encircled by an electric energizing coil 2, fed with AC current from wires 2a and 2b, and to which are secured two polar pieces 3 and 4 extending parallel on either side of this core (see FIGURES 1 and 2).

Each polar piece 3 and 4 carries on its free part a thin shoe 5, formed of a magnetizable plate having a thickness of about 1 mm. and shaped with a rounded profile the centre of curvature of which corresponds to that of rotor 6 of the motor mounted between said pieces 3 and 4.

The air-gap separating this rotor 6 from the two shoes 5 is of the order of about 1.5 mm.

This air-gap of a relatively considerable size is made possible in the subject embodiment because the rotor consists of a strongly anisotropic ferrite block. In the conventional motors of this type the air-gap is only of the order of 0.2 to 0.3 mm.

Owing to the size of the air-gap possible with the motor of the invention, there does not arise tolerance problems during assembly; moreover, even in the case where certain metallic dusts were to be drawn to the rotor when mounting, they would not cause trouble in the operation of the motor, which is evidently not the case with conventional motors.

Rotor 6 is mounted on a shaft 7 secured in a central opening of this rotor by any suitable means, for example by gluing, and pivoted in a single bearing 8 carried by a support 9, mounted outside the polar pieces 3 and 4 on the side opposite core 1.

The angle of oscillation of the rotor of the motor according to the invention can be determined with precision: this angle in effect is in direct function of the length of the stator shoes enveloping the rotor.

Figure 3:
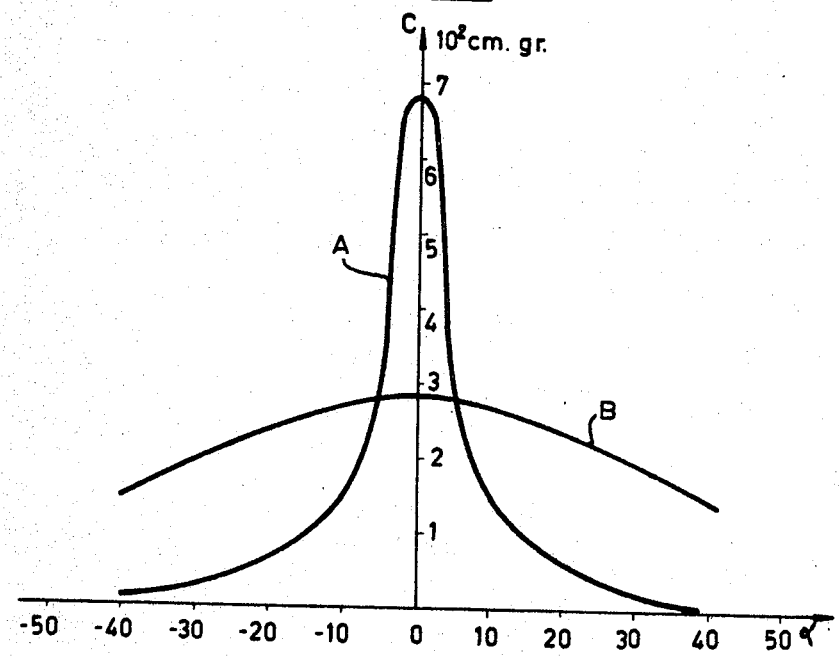
FIGURE 3 is a graph the curves of which show a variation of the couple exerted on the conventional motor compared with that exerted on a motor according to the invention as a function of the angular displacement of the rotor.

The graph of FIGURE 3 shows for the static operation of an oscillating motor, the variation of the couple acting on its rotor when the same is moved away from its neutral position by a variable angle $\alpha$.

Curve A relates to an oscillating motor having polar pieces without shoes and having a conventional rotor separated from these pieces by an air-gap of the order of 0.2 to 0.3 mm.

Curve B is that of a motor according to the invention with shoes, ferrite rotor and air-gap of about 1.5 mm.

In order to effect the measurements the result of which is shown on this graph, the winding 1 is fed with a direct current having an intensity corresponding to that of the effective value of the current absorbed during the normal operation of the motor when fed with single phased alternating current.

It is seen that couple C of the motor the characteristic of which is indicated by curve A, decreases abruptly when the angle $\alpha$ varies from 0° to +12° or from 0 to —12°. Moreover, for a deviation of the rotor of +45°, couple C is practically nil.

On the contrary, in the case of the motor of the invention the curve of which B, reflects the evolution of couple C measured as a static function of the motor, the maximum couple for a deviation of an angle $\alpha=0°$ is less than a maximum couple given by curve A but the couple of this motor decreases only by about 40% for a deviation of 45°.

By giving the correct saturation to the polar shoes of this motor, it is even possible to obtain a curve of the couples for static functioning which is practically flat in function of the deviation of the rotor which is translated, during dynamic operation of this same motor, by a maximum reduction of about 20% of the couple.

The conventional type motor is thus very sensitive to an external resistant couple since its couple can become very weak; on the contrary, in the new motor of the invention, the angular deviation is practically independent of such a resistant couple.

It is also worthy to remark that with a conventional oscillating motor, of the type used for establishing a curve A, this curve is not really symmetrical for angular displacements of the rotor effected on either side of the neutral axis of the motor only if the air-gap and the rotor are strictly symmetrical.

The least asymmetry thus gives rise to an important deformation of curve A, which is tantamount to saying that if the conventional construction is not made with great care, there will result incorrect operation of the motor.

In the case of an oscillating motor according to the invention, that is to say provided with polar pieces, a ferrite rotor and having an air-gap much larger, there is noticed practically no interfering asymmetry.

While I have described a preferred embodiment of my invention, it will be understood that various other modifications may be made without departing from the spirit thereof. I wish therefore to be limited not by the foregoing description but, on the contrary, solely by the claims granted to me.

What is claimed is:
1. An oscillating electric motor including
   (a) a permanent magnet rotor mounted for angular oscillation about an axis and magnetized in a direction transverse to said axis,
   (b) an electromagnetic stator having a pair of spaced legs extending longitudinally of said axis with respective pole sections at first ends thereof on opposite sides of said rotor and a transverse section joining said legs near the other ends thereof,
   (c) and a coil encircling said transverse section for A-C energization to produce oscillation of said rotor,
   (d) said rotor having a neutral position in which the magnetic poles thereof lie approximately midway between the sides of said pole sections,
wherein the improvement comprises
   (e) shoe portions of magnetizable material extending circumferentially of said rotor on each lateral side of said pole sections for substantially the full length of the permanent magnet rotor,
   (f) the thickness of said shoe portions being less than the air gap between said pole sections and the rotor and being substantially less than the radial dimension of said pole sections.

2. An oscillating electric motor according to claim 1 including
   a pair of shoes of magnetizable material on the inner faces of said pole sections, respectively, and extending beyond the lateral sides thereof to form said shoe portions.

3. An oscillating electric motor according to claim 1 in which said permanent magnet rotor is of anisotropic ferrite material.

References Cited

UNITED STATES PATENTS

| 1,764,658 | 6/1930  | Stoecklin  | 310—36 X  |
| 2,096,458 | 10/1939 | Johnson    | 310—39    |
| 2,193,406 | 3/1940  | Goss et al.| 310—218 X |
| 2,214,850 | 9/1940  | Arey       | 310—163   |
| 2,771,572 | 11/1956 | Adams      | 310—36 X  |

MILTON O. HIRSHFIELD, Primary Examiner

D. F. DUGGAN, Assistant Examiner

U.S. Cl. X.R.

335—229